Patented June 17, 1924.

1,498,403

UNITED STATES PATENT OFFICE.

OTTO SCHMIDT AND HEINRICH ULRICH, OF LUDWIGSHAFEN-ON-THE-RHINE, GERMANY, ASSIGNORS TO BADISCHE ANILIN- & SODA-FABRIK, OF LUDWIGSHAFEN-ON-THE-RHINE, GERMANY, A CORPORATION OF GERMANY.

TANNING MATERIAL AND PROCESS OF MAKING IT.

No Drawing. Application filed May 5, 1923. Serial No. 637,007.

*To all whom it may concern:*

Be it known that we, OTTO SCHMIDT and HEINRICH ULRICH, citizens of the German Empire, residing at Ludwigshafen-on-the-Rhine, Germany, have invented new and useful Improvements in Tanning Materials and Processes of Making Them, of which the following is a specification.

This invention relates to valuable products obtained by the action of nitric oxids on coal, such as charcoal, brown coal, mineral coal and other coaly substances. It is advantageous to work in the presence of water or steam. The action of nitric oxids on the coaly substances may also be effected in the presence of catalysts, as for instance ferrous sulfate and so on, the result being an accelerated and more complete reaction.

The substances so obtained are precipitating glue, have a brown color and may be employed for tanning either by themselves or in mixture with other synthetic or natural tanning agents.

In order to illustrate the nature of this invention the following examples are given, to which however the invention is not limited. The parts are by weight.

*Example 1.*

200 parts of finely powdered, moist brown coal are made into a paste with a solution of 20 parts ferrous sulfate in 200 parts of water; the paste is heated on the reflux cooler to an initial temperature of 70 degrees centigrade and then to 90 degrees centigrade and nitric oxid mixed with air is introduced into the solution while stirring until a test portion of the reaction mass is soluble or nearly soluble in alkali. The reaction product is filtered and washed with water; it consists of humus substances of an acid character, having generally a brown color and being insoluble or nearly insoluble in cold water. Said products can be dissolved in alkalies and precipitated from such solutions by strong mineral acids but not by diluted acetic acid. The solution acidified with acetic acid may be employed for tanning either directly or in mixture with other synthetic or natural tanning agents.

*Example 2.*

300 parts of a highly humus lignite dried in the air are made into a paste with about 300 parts of water in a suitable vessel while adding 30 parts of ferrous sulfate and while stirring, the mass is exposed to the action of nitrogen dioxid mixed with air. The gas is passed in at an ordinary temperature which is then slowly raised to 60 degrees to 80 degrees centigrade, whereby the contents of the vessel foams up and becomes gradually nearly completely soluble in alkali. The reaction product is evaporated to dryness on the water bath, the residue being a reddish-brown solid product which is soluble in a small quantity of diluted caustic soda solution except a small quantity of iron oxids which remains insoluble and is removed by filtration and after being slightly acidified with acetic acid can be employed for tanning animal hides.

What we claim is:

1. A process of producing glue-precipitating substances which consists in treating solid coaly substances with nitric oxids in the presence of water.

2. A process of producing glue-precipitating substances which consists in treating solid charcoal, brown coal or mineral coal with nitric oxids in the presence of water.

3. A process of producing glue-precipitating substances which consists in treating coaly substances with nitric oxids in the presence of water and a catalyst.

4. As a new article of manufacture tanning compositions obtained by the action of nitric oxids on coaly substances in the presence of water which products are easily soluble in alkalies, possess a brown color and precipitate glue.

5. As a new article of manufacture tanning compositions obtained by the action of nitric oxids on coaly substances in the presence of water, mixed with other synthetic or natural tanning agents.

In testimony whereof we have hereunto set our hands.

OTTO SCHMIDT.
HEINRICH ULRICH.